United States Patent [19]
Gillham

[11] Patent Number: 5,266,213
[45] Date of Patent: Nov. 30, 1993

[54] CLEANING HALOGENATED CONTAMINANTS FROM GROUNDWATER

[76] Inventor: Robert W. Gillham, 11 Crawford Street, Guelph, Canada

[21] Appl. No.: 859,298
[22] PCT Filed: Nov. 28, 1990
[86] PCT No.: PCT/GB90/01848
§ 371 Date: May 26, 1992
§ 102(e) Date: May 26, 1992
[87] PCT Pub. No.: WO91/08176
PCT Pub. Date: Jun. 13, 1991

[30] Foreign Application Priority Data

Nov. 28, 1989 [GB] United Kingdom ............... 8926853

[51] Int. Cl.$^5$ .................................................. C02F 1/70
[52] U.S. Cl. .................................... 210/747; 210/757; 210/763; 210/908; 210/909; 210/170
[58] Field of Search ............... 210/757, 747, 170, 763, 210/908, 909

[56] References Cited

U.S. PATENT DOCUMENTS

| | | | |
|---|---|---|---|
| 2,758,084 | 8/1956 | Deyrup et al. | 210/909 |
| 3,640,821 | 2/1972 | Sweeney. | |
| 3,737,384 | 6/1973 | Sweeney. | |
| 4,219,419 | 8/1980 | Sweeney. | |
| 4,382,865 | 5/1983 | Sweeney. | |
| 4,401,569 | 8/1983 | Shaveri et al. | 210/747 |
| 4,417,977 | 11/1983 | Pytlewski. | |
| 4,430,208 | 2/1984 | Pytlewski. | |
| 4,460,797 | 7/1984 | Pytlewski. | |
| 4,471,143 | 9/1984 | Pytlewski. | |
| 4,523,043 | 6/1985 | Pytlewski. | |
| 4,591,443 | 5/1986 | Brown et al. | 210/759 |
| 4,664,809 | 5/1987 | Fenton et al. | 210/747 |
| 4,789,486 | 12/1988 | Ritter | 210/170 |
| 5,057,227 | 10/1991 | Cohen | 210/747 |

FOREIGN PATENT DOCUMENTS

| | | |
|---|---|---|
| 3904652 | 8/1990 | Fed. Rep. of Germany. |
| 8401772 | 1/1986 | Netherlands. |

OTHER PUBLICATIONS

Chemical Abstracts, vol. 103, No. 22, 2 Dec. 1985 (Dombush Treatment of Leachate . . . ).

Primary Examiner—Stanley S. Silverman
Assistant Examiner—Cynthia L. Nessler
Attorney, Agent, or Firm—Anthony Asquith

[57] ABSTRACT

Groundwater is contained under highly reducing conditions. The Eh value is brought down to −100 or −200 mV, at which the contaminant breaks down, probably by a hydrolysis reaction. The contaminated groundwater is fed through a trench containing a metal such as iron filings, which is effective, under strict exclusion of oxygen, and over a period of time, to lower the Eh. Alternatively, the water may be pumped through an enclosed tank containing iron, or other metal, filings or other high-surface-area form.

6 Claims, 2 Drawing Sheets

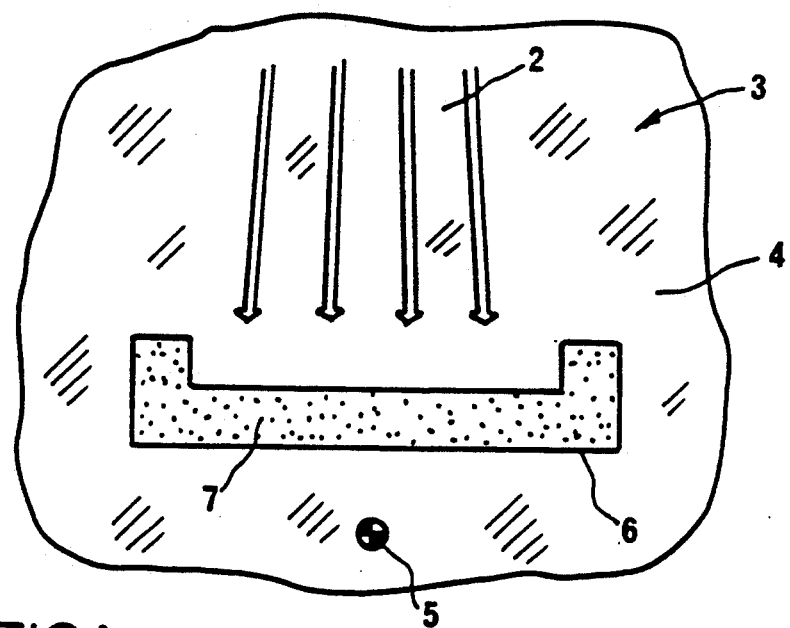
FIG 1
FIG 2
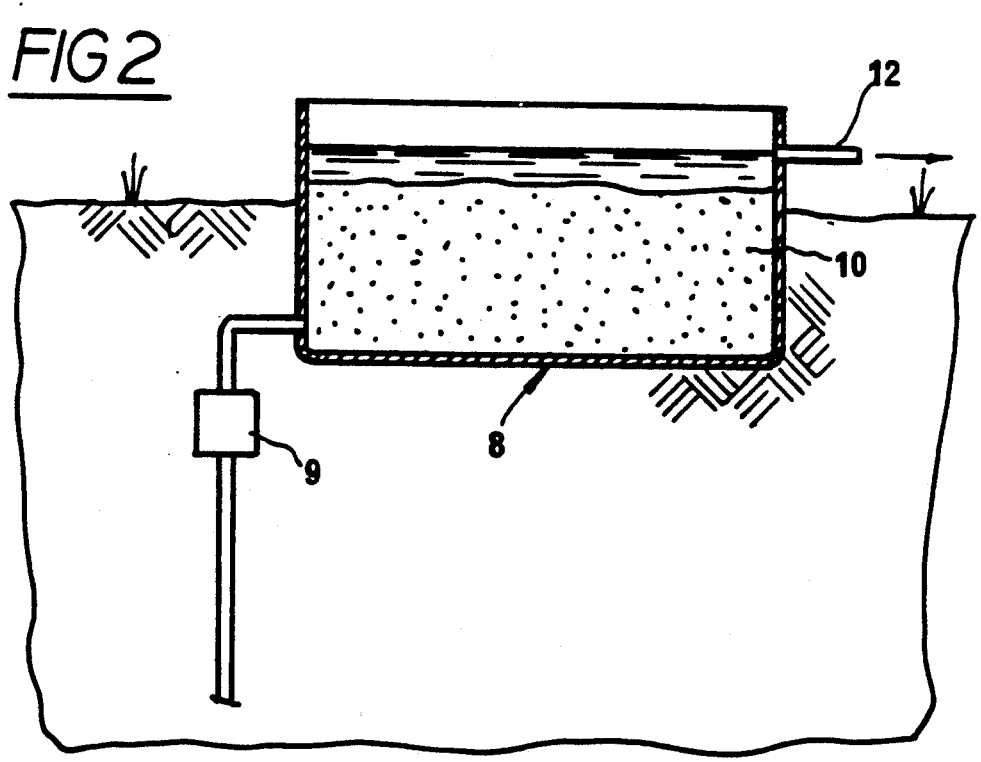

CLEANING HALOGENATED CONTAMINANTS FROM GROUNDWATER

This invention relates to a procedure for cleaning groundwater, being groundwater which is permeating through an aquifer, that has been contaminated with chlorinated or halogenated organic compounds such as solvents, or pesticides.

The invention is concerned with groundwater in its native aquifer, the term aquifer being used herein in its broad sense to signify any in-ground geological formation containing water, including sand and gravel, broken rock, etc, and is not intended to be limited only to those formations which yield a water supply.

Industrial solvents such as carbon tetrachloride, trichloroethane, tetrachloroethylene, and also PCB, and chloroform, can be highly toxic and carcinogenic, in groundwater. In drinking water, only tiny concentrations, as measured in the parts-per-billion range, of such contaminants are permitted.

BACKGROUND TO THE INVENTION

The conventional procedures for cleaning groundwater that has been contaminated with such chlorinated solvents have generally not involved the chemical breakdown of the contaminant, but have merely removed the contaminant from the water. For example, it is known to pass the water over activated carbon, whereby the contaminants are adsorbed onto the carbon. Whilst this is effective to clean the water, the contaminants remain on the carbon: this creates in turn another disposal problem.

Since, as a general rule, the contaminants are volatile, they may also be removed by air-stripping. The water is aerated, which cleans the water, but the problem again remains that the contaminants still exist. It is becoming increasingly unacceptable simply to discharge the contaminated air into the atmosphere, so that the contaminants once again have to be removed, for example by sorbtion onto activated carbon.

An alternative conventional procedure does break down chlorinated contaminants. This procedure involves catalytic oxidation at an elevated temperature; though very expensive, the procedure breaks the contaminants down into carbon dioxide and an appropriate chloride, which is harmless in small concentrations. The procedure is usually out of the question on cost grounds, for a drinking water supply.

In U.S. Pat. No. 4,382,865 (SWEENY, May 10, 1983) there is disclosed a system for treating the effluent created during the manufacture of halogenated pesticides. Here, the effluent water stream, containing the waste material from the pesticide manufactory is passed over a combination of metals, and it is the fact of the combination which is instrumental in causing the breakdown of the halogenated contaminant.

The present invention is concerned, like Sweeny, with removing halogenated contaminants from water; unlike Sweeny, the invention is concerned with removing halogenated contaminants, particularly solvents, from groundwater that is permeating through its native aquifer. It is recognised, in the invention, that a key aspect of such groundwater is that, unlike a factory effluent, groundwater can be expected, as a general rule, to be substantially oxygen-free.

It is recognised, in the invention, that the chemical break-down of halogenated contaminants in in-ground groundwater can be effected much more cheaply than is suggested by the prior art, by using, for example, materials that can be obtained, in the quantities needed, as a discarded by-product from metal-cutting processing.

GENERAL FEATURES OF THE INVENTION

In the invention, the water containing the halogenated organic contaminants is placed under, and held for a substantial period under, or remains under, highly reducing conditions, and the groundwater is brought into intimate contact, during the said period, with a metal. It is thought that under those conditions the chlorine (or it may be another halogen) ion in the organic material can be replaced by a hydroxide ion, whilst the released chloride ion remains in solution. The chloride remains in the water, or it may be precipitated out, at concentrations that usually are well below the permitted limits for inorganic chlorides.

Thus, the organic molecule is rendered harmless by what is thought to be hydrolysis reaction, and the chlorine passes into an inorganic compound that is harmless at these trace concentrations. It is recognized in the invention that this favourable reaction takes place because of the highly reducing conditions.

It is recognized, in the invention, that the Eh voltage of the contaminated water, i.e. the value as measured using an Eh probe and meter, must be brought below $-100$ mV, and preferably should be brought down to $-200$ mV.

It is recognized, in the invention, first that all sources of oxygen must be removed from, or kept from, the groundwater, which will serve to lower the Eh value almost to zero, and also that the intimate contact with the metal will lower the Eh value still further.

The metal should be in a very intimate contact with the groundwater, and the contact should be prolonged: thus the metal should be in the form of small particles or fibres, whereby each unit mass of the metal is utilized efficiently, in that it has a large interface area exposed to the groundwater. The larger the interface area, the shorter the residence period that the groundwater needs to spend in the body of metal before its Eh voltage drops.

Preferably, the metal is iron, and is in the form of iron filings or cuttings, or steel wool.

In cleaning groundwater in its native aquifer, it is much preferred on cost grounds to treat the water at ambient temperatures. It is recognized that the breakdown of the halogenated contaminants, which is probably, as mentioned, a hydrolysis reaction, can take place under the highly reducing conditions obtainable in groundwater, as described, at ambient temperatures.

It is also recognised in the invention that the pH value of water is important in determining the rate at which the halogenated contaminants break down. Most groundwaters, while present in their native aquifers, are naturally at substantially neutral pH, and the invention provides that the contaminant breakdown occurs in such a naturally pH-neutral environment.

BRIEF DESCRIPTION OF THE DRAWINGS

By way of further explanation of the invention, an exemplary embodiment of the invention will now be described with reference to the accompanying drawings, in which:

FIG. 1 is a plan view of a region of an agulfer, in which a body of an halogenated contaminant is being removed by means of a process which embodies the invention;

FIG. 2 is a diagram showing the operation of another process which embodies the invention;

DETAILED DESCRIPTION OF THE PREFERRED EMBODIMENT

Figure 3:
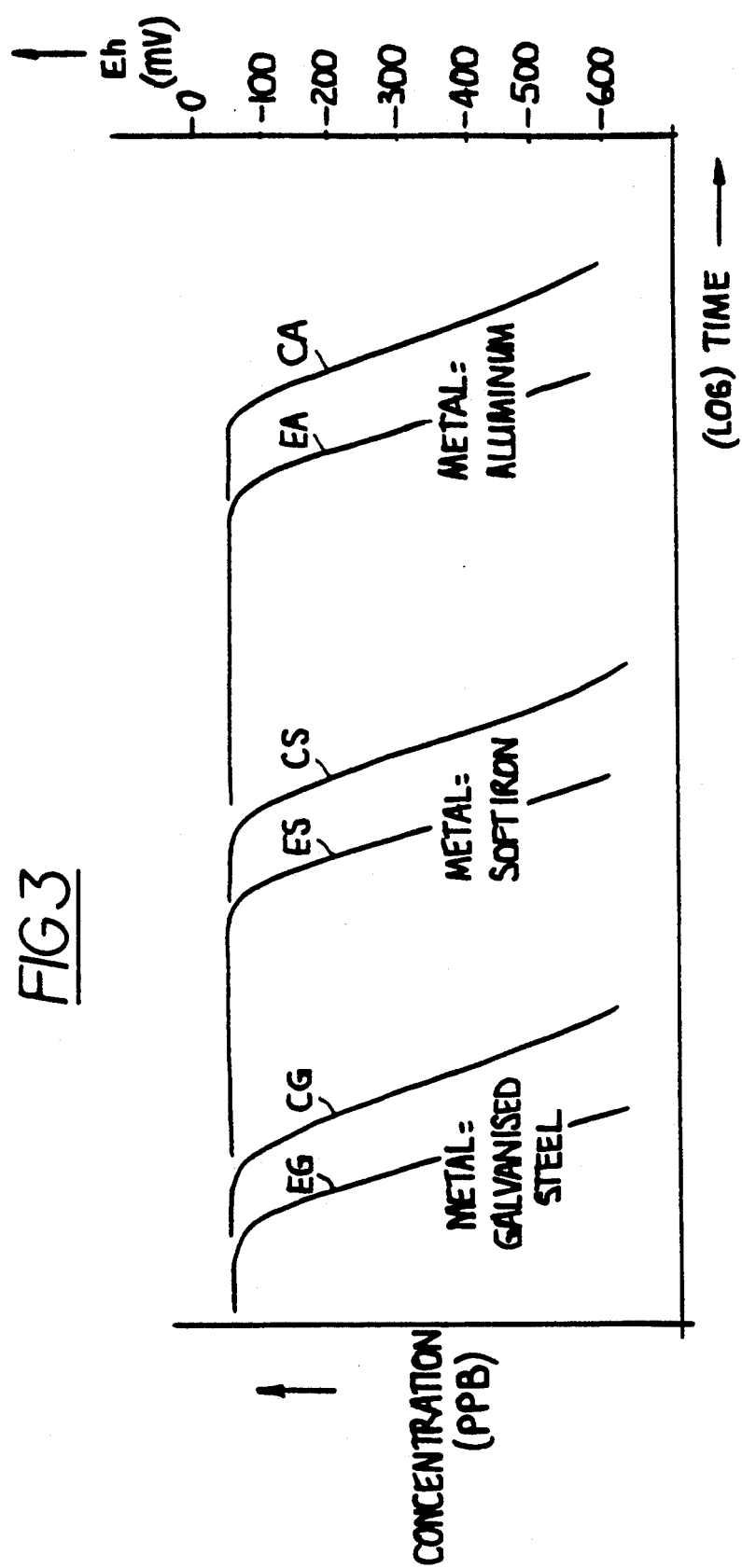
FIG. 3 is a graph showing how the contaminant concentration in the water, and the Eh value of the water, change with respect to time.

The procedures shown in the accompanying drawings and described below are examples which embody the invention. It should be noted that the scope of the invention is defined by the accompanying claims, and not necessarily by specific features of exemplary embodiments.

FIG. 1 shows a body of contaminated water 2, the contaminant being for example carbon tetrachloride or another industrial solvent, which has accidentally entered an aquifer 3 and is contaminating the groundwater 4.

The permeability of the aquifer 3 is such that the contaminant is able to move through the aquifer in a particular direction, thus forming a plume of the contaminant.

If it is discovered that the plume is heading for a well 5, and wells can attract groundwater from considerable distances, it becomes economically worthwhile to take steps to prevent the well from being contaminated.

In this exemplary case, the contaminant may be of unknown origin, and the reason for devoting resources to cleaning up the contaminant is to save the well water from being contaminated. In an alternative situation, a clean-up may be called for, not because of a danger to a particular water supply, but simply because an industrial undertaking has caused a spill to occur, and is obligated to clean it up.

A trench 6 is excavated in the path of the plume, and a body 7 of mixed iron filings and sand is placed in the trench 6. The mixture may be placed in the lower part of the trench, while the upper portion of the trench, above the vertical extent of the plume, may be filled in with the excavated soil or gravel from the trench. The body 7 in the trench 6, as regards its horizontal extent and its vertical depth, is of such dimensions that substantially all of the plume must flow through the body 7.

The body 7 should not constitute a barrier to the flow of water, and so the permeability of the iron-sand mixture should be no lower than that of the aquifer itself. There should be no liner present between the body 7 and the material of the aquifer 3, or at least none which would reduce the permeability of the trench; also, any shoring which was employed when excavating the trench, to support the walls, should be removed once the body 7 is in place.

The dimensions of the trench, and the quantity of iron filings to be placed therein, should be such as will ensure an adequate residence time of the contaminated groundwater in contact with the metal. A residence period in the region of one or two days is preferred, in the invention, and the width of the trench should be set with this in mind.

The iron should be so placed in the trench that no oxygen can reach the iron. Thus, the rron should be buried within the trench. Any portion of the iron which is accessible to oxygen will simply rust, and be ineffective to promote the breakdown of the contaminant. However, such exposed iron, once rusted, would act to seal off the rest of the iron below, which may be termed the anaerobic portion of the iron; but other less expensive materials, such as the soil excavated from the trench, are preferred to iron, to perform this sealing function. The anaerobic portion of the iron is so disposed in the trench that substantially all the contaminated water in the plume has to pass through the trench, and has to pass through the anaerobic portion of the iron, and in fact has to remain in the anaerobic portion for a considerable period.

It is not necessary that the trench should contain only the metal, and as mentioned sand or other bulk filler material may be included with the iron. The presence of the bulk material allows the groundwater moving through the trench to remain close to the iron for a long period, but the expense of providing a vast quantity of metel is avoided.

For practical purposes, the trench has to be wide enough that the trench can be excavated with conventional trench-cutting machinery. In some cases, therefore, the trench may define a space of greater width than is strictly necessary to accommodate the quantity of metal needed to break down the contaminant: in such a case, sand may be used as a bulk filler material.

The iron filings and the sand, if sand is provided, preferably are dispersed in an homogeneous mixture in the trench.

In cases where the body of contaminant surrounds the well, or if plumes of the contaminant are being drawn into the well from many different directions, the trench may be arranged so as to comprise an encirclement of the well.

As described, the trench may be created by conventional trench-cutting machinery. In an alternative procedure to cutting a trench, the body of metal can be injected into the ground using the drill-and-jet process. This process is used for forming walls in a geological formation, particularly in loose material such as gravel.

In applying the drill-and-jet process to the present invention, a series of boreholes are drilled a suitable distance apart. At each borehole, a pipe is passed down to the bottom of the borehole, and the iron filings are injected under pressure through the pipe into the boreholes, the pipe then being gradually withdrawn up the borehole. The filings penetrate into the gravel or other material. The engineer sets the spacing of the boreholes and the quantity of iron injected such that a continuous wall of filings of the required thickness is formed.

FIG. 2 shows another system. Here a tank or pond 8 is provided at the surface. The contaminated groundwater is drawn out of the soil by means of a pump 9, and is fed into the pond 8. Contained within the pond 8 is a body 10 of iron filings, or of mixed iron filings and sand, through which the water slowly percolates.

The contaminated groundwater should remain in the pond for a residence time preferably again in the region of one or two days, and the dimensions of the pond, and the quantity of iron, should be calculated accordingly. Thus, for a groundwater throughput rate in the region of 100 liters per minute, the pond should be about 10 meters square in extent, and about 3 meters deep.

Water exits from the pond via an outlet pipe 12, from which it may be put back into the aquifer, fed into the water supply, or sent for such other treatment as may be required.

As shown in FIG. 2, the contaminated groundwater should be fed straight into the bottom of the pond, and should not be exposed to the atmosphere prior to entering the pond. Groundwater from a deep region can be expected to be already substantially oxygen-free; it is recognised in the invention that the process of lowering the Eh value to −100 or −200 mV is much less demanding when the water remains oxygen-free than when the water has just been exposed to the atmosphere.

The disadvantage of the pond system, as shown in FIG. 2, compared with the trench system of FIG. 1, is that a pump is required in the pond system, with associated maintenance and service, whereas the trench system, once installed, is entirely passive. The decision between the two systems is one of economics: the expense of pumping has to be offset against the expense of making a deep trench. A trench will not generally be economical for depths below about 20 or 30 meters.

In the pond, the upper levels of the pond may be expected to contain some oxygen, and indeed the iron in the upper levels may be expected to oxidize. The volume of the pond should obtain therefore preferably in its depth rather than in its extent. The pond should be lined with impermeable material, e.g. concrete or clay, to prevent oxygen-containing water from seeping in.

If possible, the pond also should be roofed over with impermeable material: insofar as the pond is open to the atmosphere the upper levels of the pond, and of the iron, will be ineffective in lowering the Eh voltage of the water, and if the pond is exposed it therefore should be correspondingly deeper, and be large enough to retain the water at depth for a good residence period.

It is recognized, in the invention, that the iron itself will slowly dissolve into the water, under the heavily reducing conditions as described. After a prolonged period of service, fresh iron might have to be placed in the trench or pond.

In FIG. 3, the graph CS shows the level of concentration of a halogenated contaminant in water, over a period of time. Graph ES shows the Eh voltage of the same water over the same period. (The graphs are shown diagrammatically, and merely illustrate the trends.) It may be seen that once the Eh value has fallen, the breakdown of the contaminant quickly occurs. The graphs CS and ES arose from the use of soft iron. Graphs CG and EG are the corresponding graphs when galvanized iron is used, and graphs CA and EA are the corresponding graphs when aluminum is used.

It will be noted that a delay occurs before the Eh voltage falls, and before the contaminant breaks down. This delay is thought to be attributable to the time required for the final depletion of oxygen in the groundwater and the onset of the low Eh values. Also, the delay varies in accordance with the type of metal used. It may be surmised that the variation in the delay is due to the variation in the extent to which metals are reactive. Thus, zinc is more reactive than iron which is more reactive than aluminum, and this corresponds to the series shown in FIG. 3.

Even stainless steel may be the metal used to cause the Eh value to fall although the delay then is quite considerable. It is preferred to use a metal which has a small delay time, so that the required residence time is at a minimum, with the proviso that the metal itself should be obtainable, in bulk and in particulate or fillings form, without undue cost. Iron would be the first choice in most cases.

The graphs shown in FIG. 3 should not be taken as being exhaustively representative: in some cases, it has been found that the contaminant level starts to fall significantly even while the Eh voltage is zero. However, in all cases it has been observed that the Eh falls to the −100 mV level, or lower, before the contaminant can be removed down to the tiny trace levels that can be accepted.

The purpose of providing the metal in the form of filings is to ensure that the metal has a high surface-area-to-volume ratio: other forms of the metal with a correspondingly high ratio may be used, depending on the kind of metal selected, such as metal dust, or fibers as in metal wool.

The iron filings need not be specifically prepared for use in the invention: one of the parameters of the economics of the invention is the fact that the filings may be the kind of filings that are scrapped from metal treatment processes. A particular example is the filings that are produced from the fettling of iron castings.

Such filings are inherently very clean. Other kinds of metal filings or cuttings may contain traces of cutting oils, etc, which might have to be cleaned off. On the one hand, these substances might interfere with the breakdown reaction of the halogenated contaminant: on the other hand, such substances can be sufficiently toxic in themselves as to warrant being kept from entering the aquifer.

Even with the fastest acting metal, the residence time needed to lower the Eh value to −100 or −200 milli-Volts is far in excess of any residence time that might arise by accident. It is recognized, in the invention, that there should be intimate contact over a large interface area between the metal and the water, for a long period. Thus, it would not be within the scope of the invention, for example, simply to pass the contaminated water through, or allow it to stand in, a metal pipe.

The invention has been described as it relates to the cleaning of contaminated groundwater in an aquifer, i.e. water from deep underground. Such groundwater can be expected, usually, to be naturally almost completely oxygen-free. In some cases, however, groundwater does contain some dissolved oxygen: the invention is much less advantageous with such groundwaters, because of the large quantities of iron or other metal, and the very long residence times, that are needed to bring about the required fall in the Eh voltage.

The expression "Eh voltage" as used herein is an art-term refering to the measure of the presence of oxidizable material. The voltage as measured by an Eh probe is the electrical potential with respect to the hydrogen reference electrode.

I claim:

1. Procedure for cleaning an halogenated organic contaminant from groundwater in an aquifer, comprising the steps, in combination, of providing a body of metal;

of covering the body of metal in such a manner as to prevent substantially all traces of oxygen from reaching an anaerobic portion of the body of metal;

of providing the metal in the form of a body of particulates, cutting, or fibres, of such consistency that the body is permeable to the flow of the groundwater through the body;

of conducting the said contaminated groundwater from its native aquifer into and through the body of metal;

of so conducting the groundwater from the native aquifer into the body of metal that the groundwater substantially does not come into contact with atmospheric oxygen prior to entering the anaerobic portion of the body of metal;

of causing the groundwater to percolate through the said anaerobic portion, and to remain in contact with the metal therein, for a substantial period of time.

2. Procedure of claim 1, wherein the said period of time is long enough that the Eh voltage of the groundwater falls below $-100$ mV.

3. Procedure of claim 1, further comprising the steps:

of excavating a trench in the material of the aquifer, in the path of the contaminated groundwater;

of placing the said body of metal in the trench;

wherein the dimensions of, and disposition of, the trench and of the said anaerobic portion are such that the contaminated groundwater passes through the said anaerobic portion.

4. Procedure of claim 3, further comprising the step of so placing the trench in relation to a water draw-off well, and so dimensioning the trench and the said anaerobic portion of the body of metal, that substantially all water entering the well passes through the said anaerobic portion, and remains for a substantial retention time within the said portion.

5. Procedure of claim 1, further comprising the steps of providing a tank unit, having an inlet;

of placing the said body of metal in the tank unit;

of passing the contaminated groundwater from its native aquifer into and through the said tank unit;

wherein the tank unit and its inlet are so arranged as to prevent the groundwater passing into the tank unit from coming into contact with atmospheric oxygen, prior to entering the anaerobic portion of the said body of metal in the tank unit.

6. Procedure of claim 1, further comprising the steps:

of providing a series of boreholes in the material of the aquifer, in the path of the contaminated groundwater;

of injecting metal into the boreholes;

wherein the spacing of the boreholes, and the quantity of metal injected, in relation to the material of the aquifer, are such that the injected metal penetrates into the material to a sufficient extent as to form the said body of metal, and the said anaerobic portion thereof.

* * * * *